United States Patent [19]
Winters

[11] Patent Number: 6,115,195
[45] Date of Patent: Sep. 5, 2000

[54] MAGNIFYING METHOD AND APPARATUS FOR A VIEW BOX

[75] Inventor: William Winters, New Rochelle, N.Y.

[73] Assignee: Flow X-Ray Corporation, West Hempstead, N.Y.

[21] Appl. No.: 09/197,113

[22] Filed: Nov. 20, 1998

[51] Int. Cl.[7] .............................. G02B 27/02; G02B 7/02
[52] U.S. Cl. ......................... 359/802; 359/811; 359/819; 359/822; 40/361
[58] Field of Search ..................................... 359/802, 822, 359/819, 811; 40/361

[56] References Cited

U.S. PATENT DOCUMENTS

| | | | |
|---|---|---|---|
| 4,510,708 | 4/1985 | Pokrinchak | 40/361 |
| 4,529,281 | 7/1985 | DeRoche | 353/27 |
| 5,757,560 | 5/1998 | Fisherman | 359/821 |

*Primary Examiner*—Georgia Epps
*Assistant Examiner*—Saeed Seyrafi
*Attorney, Agent, or Firm*—Frommer Lawrence & Haug LLP; Thomas J. Kowalski; I. Marc Asperas

[57] ABSTRACT

A magnifier for imaging film units is provided. A magnifying lens is coupled to a view box which may be a stationary view box or mass film motorized viewer for viewing X-ray images. A positioner is provided for positioning the magnifying lens proximate the particular area of interest of the image. Normally, the magnifier remains coupled to the view box, but may be detached such that the view box can operate as a standard view box. With this arrangement, standard view boxes are retrofitted with the present invention. The positioner is hinged to both adjust the focal distance of the magnifier and position the magnifier away from the view box in an open position which does not obstruct the view of the image. The positioner may be coupled to a longitudinal arm situated on a side of the view box which is manually moved or may be driven by one or more motors at the control of an operator's console. Patient information and positions of the magnifier may be entered via the operator's console and stored in a memory. Using two motors, the positioning of the magnifier may be driven by a pair of cross-bars which are coupled to the magnifier at an intersecting point and moved by the motors. The magnifier may be elongated having a flat surface bearing on the film and an arcuate surface opposite thereto for magnifying the image which is particularly suited for imaging dental X-ray images. The magnifier may be integrated inside the view box such that light directed therethrough is re-directed in an oblique direction, passed through the film unit and magnified thereby. A linearizer which may be a transparent overlay covering the film unit linearizes the magnified image to remove any distortions resulting from the magnification.

39 Claims, 5 Drawing Sheets

MAGNIFYING METHOD AND APPARATUS FOR A VIEW BOX

BACKGROUND OF THE INVENTION

1. Field of the Invention

The present invention, relates to a magnifier and, more particularly, to a magnifier for a view box for magnifying X-ray films.

2. Description of the Related Art

The invention of the X-ray for medical examination is arguably the most important break-through in medical examination history. The X-ray is employed not only to ascertain the nature of the patient's malady but also to track the progress of the patient throughout treatment. The X-ray, thus, determines the initial diagnosis and the treatment of the patient. It is, therefore, critical that the X-ray be properly "read" in order to provide the correct diagnosis and eventual course of treatment.

The radiologist, who is a certified medical doctor, plays a key role in interpreting, e.g., "reading", X-rays because it is the radiologist's function to analyze the X-ray and report the diagnosis to the patient's physician. The radiologist's profession is not an easy one because reading X-rays requires a trained eye which can detect the difference between healthy and unhealthy tissue. This is compounded by the problem that tissues of varying types, such as muscle or organ tissues or tissues of varying densities, such as bone or brain tissues, affect the x-ray image. Another consideration is that the X-ray may have been over-exposed and the resulting image may be darker than is desirable. In addition, the details of the particular are of interest of the X-ray image is often times too small to analyze. Perhaps the largest burden of the radiologist, however, is the knowledge that the radiologist's X-ray reading may be the difference between life and death.

The view box 100 shown in FIG. 1A is a vital instrument to the radiologist in reading X-rays because it provides a lighted platform 102 upon which the radiologist places the X-ray film 104 and, by operation of switch 106, illuminates the X-ray film 104 for diagnosis. To provide uniformity of light, the view box employs a light source 110 which diffuse light well, white diffusing paint 112 and lighted platform 102 which further diffuses the light.

View boxes come in many varieties including those mounted on a permanent fixture or on portable stands. The view box may be a stationary view box in which the X-ray films are manually mounted/removed or a mass film motorized viewer in which the X-ray films are transported on a belt or "web" across the lighted platform. The view box may be embodied as a single unit which images single films as shown at FIG. 1A or a multiple unit as shown by the "two-in-one" unit of FIG. 1B which provides two lighted platforms 108a and 108b which are operated independently to image two different x-ray films.

A particular problem is that there are presently no means for quickly and easily magnifying the particular area of interest of the X-ray film. At present, the radiologist, in order to magnify the particular area, must resort to employing a hand-held magnifier such as an eye-piece. Problematically, such hand-held magnifiers have been found to be difficult to retrieve from a pocket and employ particularly when the doctor is wearing surgical gloves. In addition, such magnifiers, due to their small size and portability, are subject to being misplaced. In addition, the hand-held magnifier typically does not provide sufficient magnification.

The only other option of the radiologist is to remove the X-ray film from the view box and manually place the particular area of interest under a standing magnifying lens. Problematically, this is not a viable solution because the radiologist must touch the X-ray film which may damage the film unit particularly if the radiologist is wearing surgical gloves. In addition, once the film unit is moved, there is no guarantee that the radiologist will be able to reacquire the clarity of the X-ray image especially when another doctor changes the settings on the view box.

Heretofore, there has been no means by which the radiologist can quickly and sufficiently magnify a particular area of the X-ray film.

OBJECTS AND SUMMARY OF THE INVENTION

An object of the present invention is to provide a magnifier for a view box;

Another object of the present invention is to provide a magnifier for a view box which magnifies the particular area of the X-ray film;

Yet another object of the present invention is to provide a magnifier for a view box which is not costly;

As a further object, the magnifier of the present invention does not obstruct the view of the X-ray film;

A further object of the present invention is to provide an internal magnifier for a view box; and It is still a further object of the present invention to provide an internal magnifier for a view box which is not visible.

In accordance with the foregoing objectives, a magnifier apparatus and method are provided for magnifying an image which is imaged by a view box having a lighted platform upon which film units are mounted. A magnifying lens and positioner are provided for holding the magnifying lens at a distal end thereof proximate the image such that the magnifying lens magnifies a particular portion of interest of the image and coupling the magnifier to the view box.

In another aspect of the present invention, the view box is an X-ray view box for imaging X-ray film units.

In another aspect of the present invention, a longitudinal arm is slidably coupled to the positioner such that the positioner is slidable along the longitudinal arm to longitudinal positions along the image, wherein the longitudinal arm is located on a side of the lighted platform such that the image is substantially unobstructed. A hinge for hingedly coupling the positioner to the longitudinal arm such that the positioner is swiveled about the longitudinal arm and the magnifying lens may be positioned toward/away from the lighted surface which adjusts the magnifying strength of the magnifying lens. The hinge allows the positioner to position the magnifying lens to an open position such that the magnifying lens does not obstruct the image. A mount is provided for mounting coupled to the longitudinal arm for detachably mounting the longitudinal arm to the view box such that the view box may be converted to magnify the image.

In another aspect of the present invention, a motor is provided for driving the positioner to position the magnifying lens to different positions proximate the image. An operator console coupled to the view box including operator controls mounted thereon control the motor thereby controlling the positioning of the magnifying lens. A memory is provided for storing/recalling positions of the magnifying lens. The memory may also store/recall patient information.

The operator console includes a keyboard for entering the positions and the patient information and a display for displaying the positions and the patient information. The operator console may include a joystick for controlling the motor thereby setting the positions of the magnifying lens.

In a variation of the present invention, cross-bars are arranged in lateral and longitudinal directions which are coupled at an intersecting point. Motors drive the longitudinal and lateral directions of the cross-bars such that the magnifying lens coupled to the intersecting point of the cross-bars is moved. The cross-bars are positionable to a home location adjacent a corner of the lighted platform such that the cross-bars substantially do not obstruct the view of said image. A swivel may be proveded which couples the magnifying lens to the intersecting point of the cross-bars for swivelling the magnifying lens to a position proximate the image to an open position which does not obstruct a particular area of interest of the image.

In yet another aspect of the present invention, the magnifying lens is elongated in the lateral direction of the view box such that the magnifying lens spans at least a portion of thereof. A track is provided for slidably positioning the magnifying lens in the longitudinal direction proximate the image. The magnifying lens may comprise a flat surface which engages the lighted platform and an arcuate surface opposite the flat surface for magnifying the image.

In still another aspect of the invention, the positioner is integrated in the interior of the view box such that the magnifying lens is situated beneath the image. Light which is directed through the magnifying lens is redirected in an oblique direction, passed through the film unit and continues on in the oblique direction thereby magnifying the image. A light source may be situated proximate the magnifying lens for providing the light directed through the magnifying lens. The positioner may comprise a magnifier block for moving the magnifying lens and the light source within the view box to different positions of the image. The magnifier block may comprise an outer sleeve and an inner sleeve slidably coupled therein for holding the magnifying lens such that a focal length is adjusted by sliding the inner sleeve with respect to the outer sleeve. A linearizer may be situated above the image for linearizing the magnified image. When the linearizer is a transparent overlay which overlays the film unit, the linearizer does not obstruct the view of other portions of the image which are not magnified.

Other objects, features and advantages according to the present invention will become apparent from the following detailed description of the illustrated embodiments when read in conjunction with the accompanying drawings in which corresponding components are identified by the same reference numerals.

DETAILED DESCRIPTION OF THE PREFERRED EMBODIMENTS

FIGS. 2A–2G illustrate the view box magnifier 200 of the present invention. It will be appreciated that, although the several figures depict various embodiments, the present invention is not limited thereto but may encompass other embodiments as well.

Figure 1A:
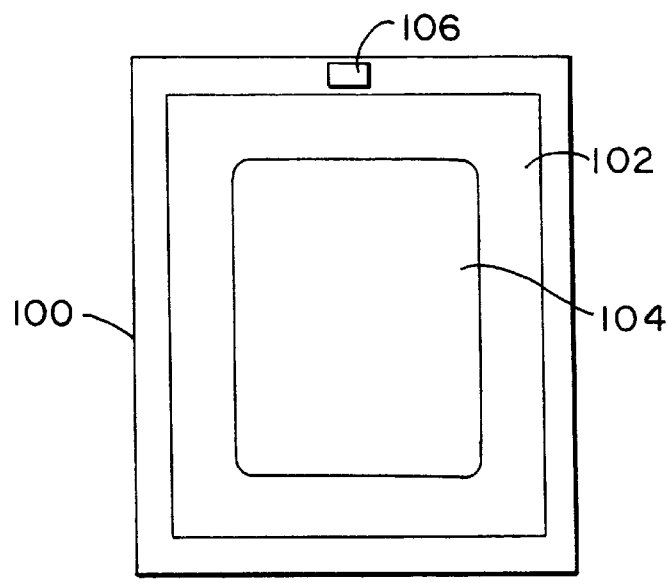
FIG. 1A illustrates a stationary view box.
Figure 1B:
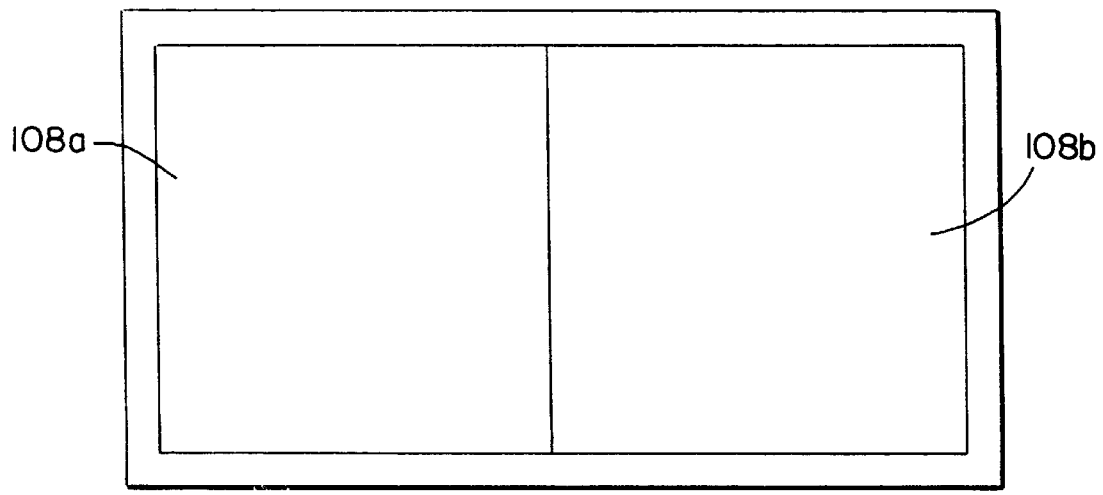
FIG. 1B illustrates the dual stationary view box.
Figure 2A:
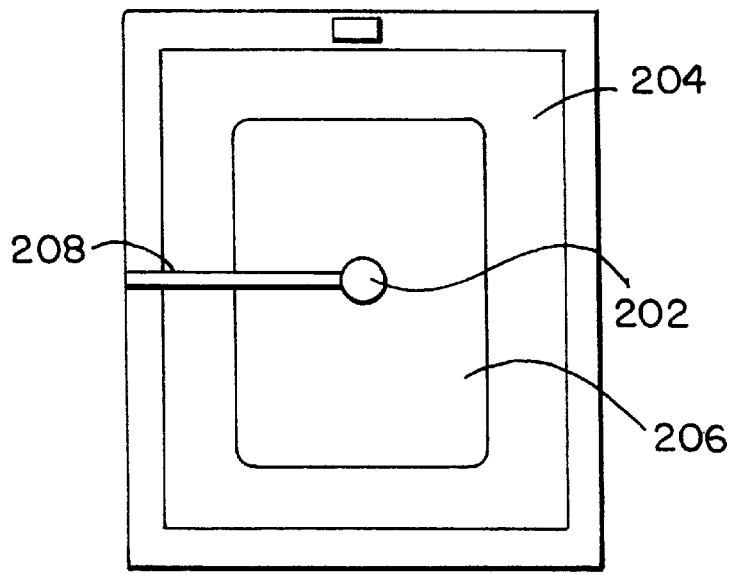
FIG. 2A illustrates a first embodiment of the magnifier for a view box of the present invention.

FIG. 2A illustrates a first embodiment of the view box magnifier 200 of the present invention wherein a magnifying lens 202 is situated by positioner 208 proximate the surface of the lighted platform 204 sandwiching the X-ray film 206 therebetween.

Figure 2B:
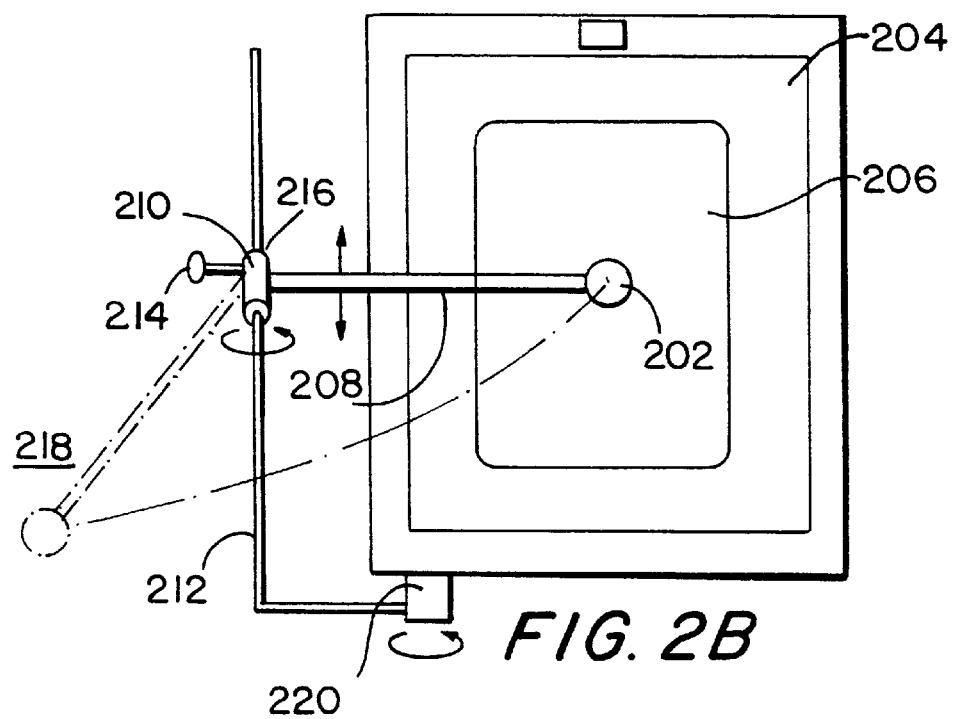
FIG. 2B illustrates a second embodiment for the magnifier of a view box of the present invention.

FIG. 2B illustrates a second embodiment wherein the view box magnifier 200 is positionable to different areas of the X-ray film. In particular, the view box magnifier 200 of the second embodiment comprises a magnifying lens 202 coupled to a positioner 208 which is comprised of a lateral bar which is hinged by a hinge 210 to a longitudinal bar 212 which is mounted to one side of the view box.

A fastening device 214 such as a fixing knob may be provided which, when tightened or un-tightened, fixes the positioner 208 in the longitudinal direction or allows the positioner 208 to be slid manually in the longitudinal direction. Additionally, a narrow slot 216 may be provided in the hinge 210 whereby the lateral bar of the positioner is frictionally slid through the narrow slot 216 such that the magnifying lens 202 is moved in the lateral direction. With this arrangement, it will be appreciated that the magnifying lens 202 of the present invention may be positioned anywhere along the X-ray film to provide magnification of the X-ray image.

The hinge 210, in addition to providing longitudinal positioning of the magnifying lens, serves to swivel the magnifying lens to and from the lighted platform such that the magnifying lens may be placed in the "open" position 218 out of the way of the X-ray image in order that the magnifying lens 202 does not obstruct the view of the radiologist. In the alternative, the radiologist may remove the magnifying lens 202 entirely by sliding the positioner 208 along the longitudinal bar 212 until the positioner slides off. With this arrangement, the magnifier view box of the present invention may be operated precisely like the standard view box.

The hinge 210 allows the radiologist to change the distance between the magnifying lens 202 and the X-ray film 206 thereby changing the focal distance and, therefore, the magnifying strength of the magnifying lens 202. With this arrangement, the radiologist can adjust the magnifying strength of the magnifying lens quickly and easily.

The lateral arm of the positioner 208 advantageously provides the radiologist with the means for moving the magnifying lens 202 without touching either the lens or the X-ray film 206. With this arrangement, the radiologist does not risk tainting the magnifying lens or damaging the X-ray film 206 particularly when wearing gloves during surgery.

The positioner 208 and/or the longitudinal bar 212 may be translucent in order to minimize any obstruction of the X-ray image thereof. Although, the lateral bar of the positioner 208 and the longitudinal bar 212 appear from FIG. 2B to be cylindrical in shape, the positioner may also be formed substantially flat in order to prevent any distortion of light passing though a round translucent surface.

While it appears from FIG. 2B that the present invention is permanently mounted to the view box, a variation of the present invention is to provide a mount 220 which may be a wing nut, opposed hook and loop strips (velcro™), or any other suitable mount which mounts the present invention to the view box. With this arrangement, the present invention may be provided to owners of standard view boxes.

It is a method of the present invention to convert, i.e. retrofit, the standard view box with the magnifying lens 202 of the present invention. In this method, the operator mounts the longitudinal bar 212, using mount 220, to the standard view box. Next, the operator slides the hinge 210 onto the longitudinal bar 212, adjusts the position of the magnifying lens 202 and tightens the fastening device 214.

Figure 2C:
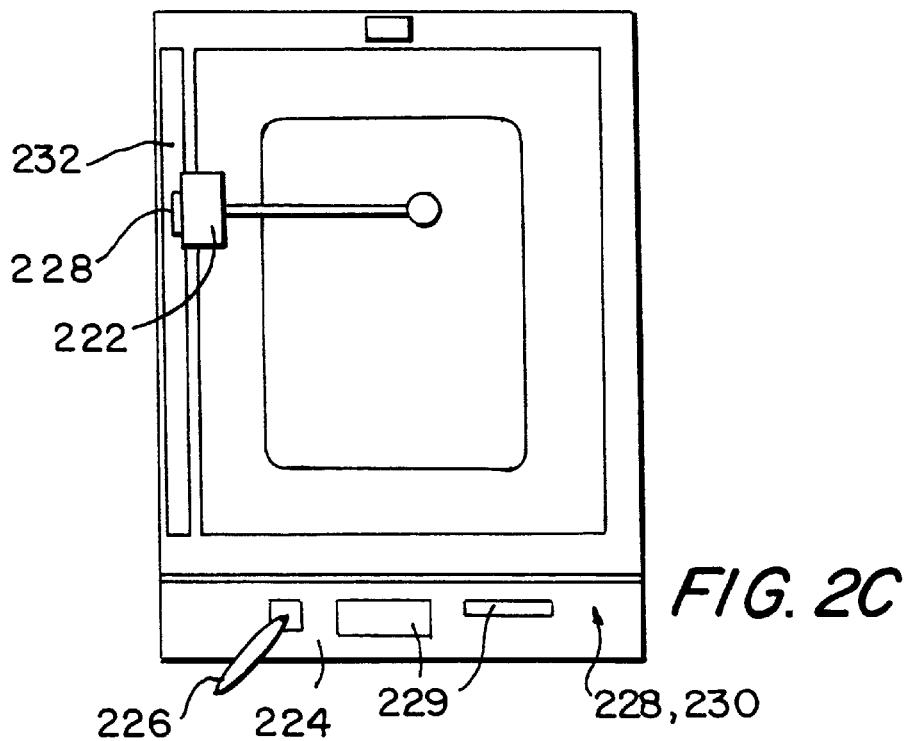
FIG. 2C illustrates a third embodiment of a magnifier for a view box of the present invention.

FIG. 2C illustrates the third embodiment of the present invention wherein the magnifying view box 200 is motorized such that the magnifying lens is positioned in the longitudinal and/or lateral directions by means of a motor 222 which drives the positioning of the magnifying lens 202. The motor 222 drives a gear 228 which, in turn, engages an opposed grid 230. The opposed grid may be situated on the longitudinal arm 212 shown in FIG. 2B or on a strip 232 affixed to the side of the view box.

An operator's console 224 which may include a joystick 226 or control-buttons may be provided to control the position of the magnifying lens 202. A CPU 228 may be provided to control the motor 222 in accordance with the operator's console-entered commands. A keypad 229 for keying in information such as patient information and/or display 231 for displaying information such as the patient information and magnifying lens position may be provided. In addition, a memory 230 may be provided which memorizes the patient information and positions of the magnifying lens 202 which may be recalled by the radiologist to re-position the magnifying lens 202 to previously stored positions.

Figure 2D:
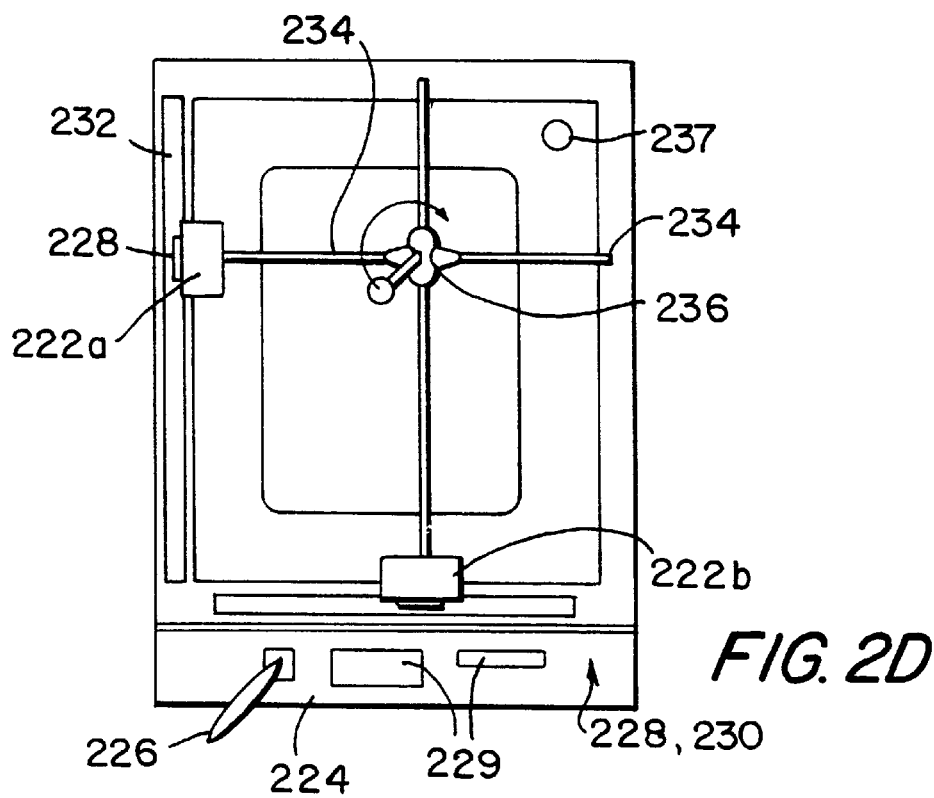
FIG. 2D illustrates a variation on the third embodiment of the present invention.

FIG. 2D illustrates a variation of the third embodiment wherein the motor 222 comprises a pair of motors 222a and 222b which respectively control lateral and longitudinal cross-bars 234. The magnifying lens 202 which is held by connected sleeves 236 is positioned by the lateral and longitudinal movement of the cross-bars 234. When not in use, the magnifying lens 202 of this arrangement may be set to a "home" position 237 located conveniently in a corner of the view box and the operator may swivel the magnifying lens 202 about swivel 238 to an open position 240 such that the magnifying lens 202 does not obstruct the X-ray image. It will be appreciated that the cross-bars 234 in the home position are proximate the sides of the view box such that the cross-bars 234 additionally do not obstruct the X-ray image.

Figure 2E:
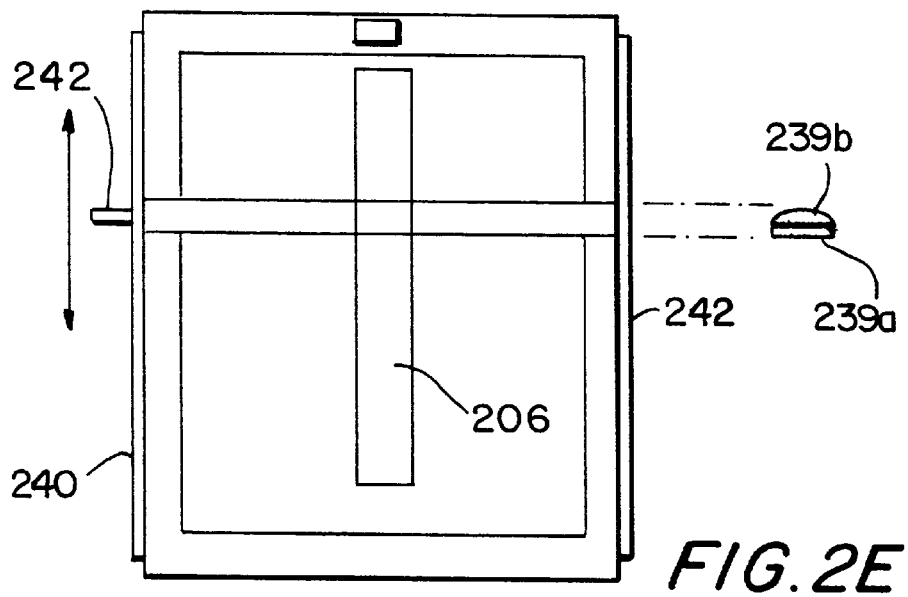
FIG. 2E illustrates a fourth embodiment of a magnifier for the view box of the present invention.

The magnifying lens 202 is illustrated in the form of a circular lens. However, as shown in FIG. 2E, the magnifying lens in a fourth embodiment may be in the shape of a partial cylinder having a flat surface 239a bearing on the lighted platform and an arcuate surface 239b opposite the platform for magnifying the X-ray image. As illustrated, the magnifying lens spans the lighted platform coupled to tracks 240 on either side. However, it will be appreciated that the magnifying lens of this embodiment may span a portion of the lighted platform. As with other embodiments of the present invention, the tracks may be permanently fixed or detachable. A tab 242 is provided which is coupled to the magnetic lens 202 to position the lens along the longitudinal axis. Although the magnifying lens 202 of this embodiment is illustrated as extending in the lateral direction, the magnifying lens may also extend in the longitudinal direction.

It will be appreciated that the magnifying lens of the fourth embodiment is particularly useful for dental X-ray films 206 which are typically elongated in the longitudinal direction and clipped at the apex of the view box. With this arrangement, the dentist or dental assistant easily magnifies dental images by sliding the magnifying lens 202 by operation of the tab 242.

Figure 2F:
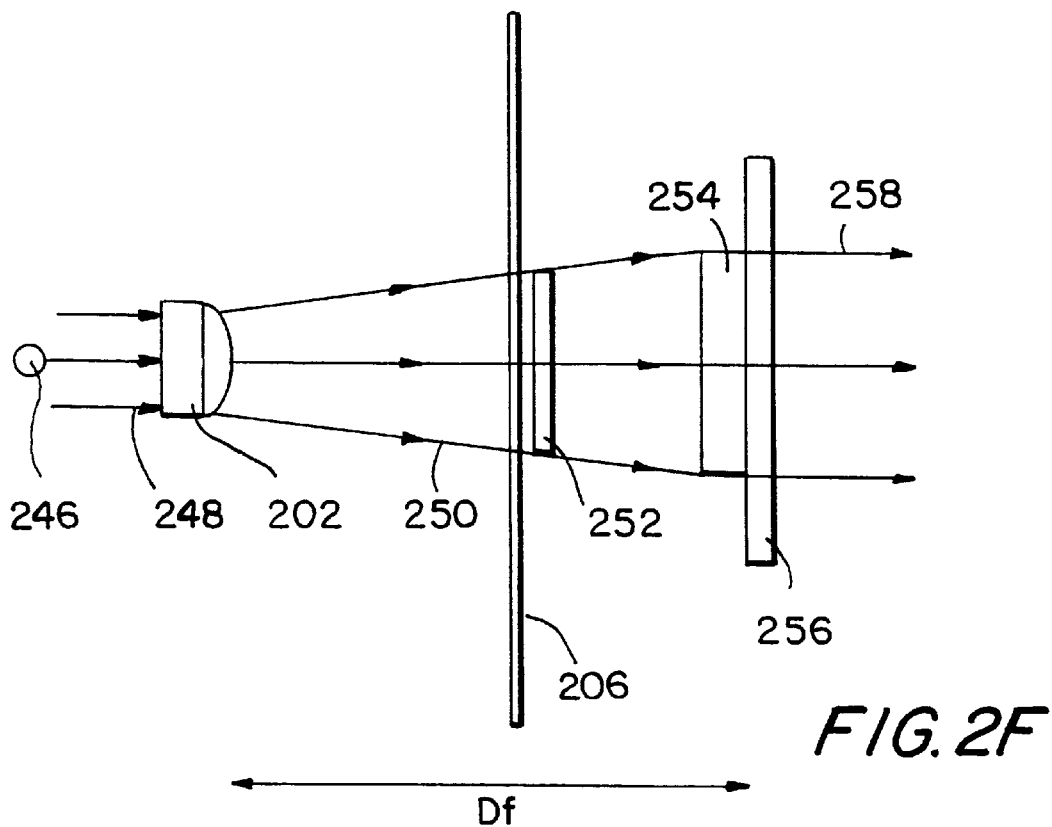
FIG. 2F illustrates the present invention.

It was discovered in the present invention that the magnifying lens could actually be placed beneath the target, i.e. X-ray film, to magnify the particular area of interest. This is illustrated in FIG. 2F which shows a light source 246 which directs light 248 upon the magnifying lens 202 which redirects the light 250 in an oblique direction. The oblique-oriented light 250 images the particular area 252 of the X-ray film 206 and continues in the oblique direction to a point where it is observed as a magnified image 254 by the operator.

In order to prevent any distortions observed by the operator due to the oblique-oriented light 250, a linearizing lens 256 may be provided in the form of an overlaying sheet or plate which linearizes the magnified image 254 resulting in linearized light 258. It will be appreciated that the linearizing lens 256 is transparent to the operator because it is translucent and it's linearizing effect does not alter other portions of the X-ray image. It will further be appreciated that the distance between the magnifying lens 202 and the linearizing lens 256, i.e. the focal distance Df, is adjusted to focus (i.e., magnify) the particular area of interest of the X-ray image.

With this arrangement, the magnifying lens 202 of the present invention is completely hidden from view from the operator such that the X-ray image is not obstructed in any way.

Figure 2G:
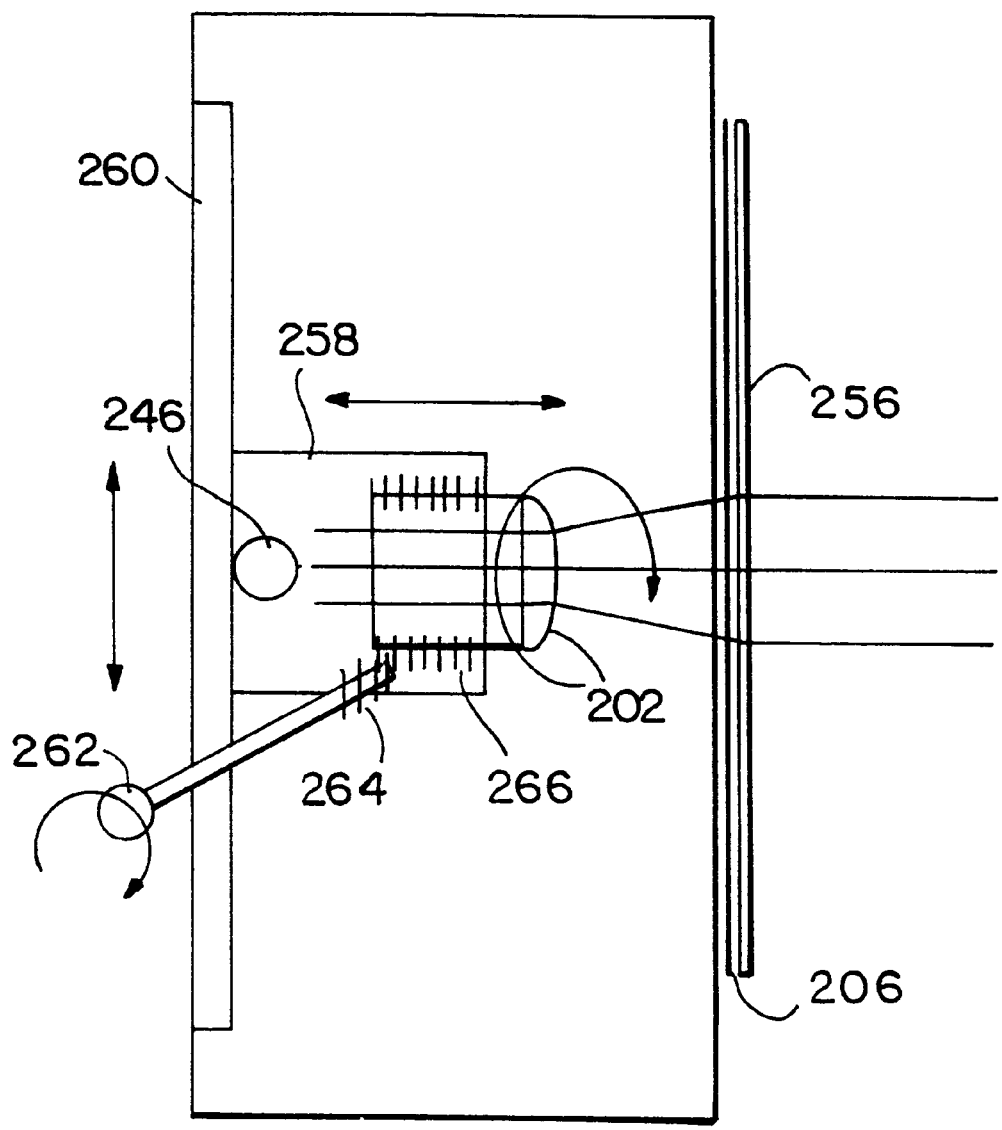
FIG. 2G illustrates a fifth embodiment of the magnifier for a view box of the present invention.

FIG. 2G illustrates a fifth embodiment of the present invention wherein the magnifying lens 202 of the present invention is integrated into the interior of the view box in accordance with the foregoing discovery. In this embodiment, the magnifying lens 202 and light source 246 is mounted in a magnifier block 258 which holds the magnifying lens in relation to the X-ray film. The magnifier block is slidably coupled to a track 260 such that the magnifying lens 202 is moved to different positions with respect to the X-ray film by sliding the magnifier block 258. A handle 262 may be provided which is coupled to the magnifier block 258 which allows the operator to move the magnifier block along the track to position the magnifying lens 202 to the particular area of interest of the X-ray image.

In addition, the focal distance Df may be adjusted in this embodiment to change the magnification of the magnifying lens. In more detail, the magnifier block 258 further comprises an outer sleeve 268 and a threaded inner sleeve 270 which holds the magnifying lens 202. The threads 266 of the threaded inner sleeve 270 engage threads 264 formed in a perpendicular plane on the end of the handle. When the operator rotates the handle, and therefore the threads 264 at the end thereof, the threaded inner sleeve 270 engaged therewith rotates, causing the inner sleeve (and the magnifying lens 202 coupled thereto) to translate toward or away from the X-ray film with respect to an outer sleeve 268.

More particularly, back lights 302, preferably fluorescent bulbs, provide back lighting of the X-ray film as well as serve to diffuse the light. White paint 304 which additionally diffuses the light is coated inside the view box. Magnifier block 306a is formed of a box which houses the illuminating light 306b, which is preferably a halogen bulb. In particular, the magnifier block 306a is box-shaped and coated with white paint to intensify the light of the illuminating bulb 306b.

The magnifier block 306a of the present invention is shown selectively positioned along the Y-axis. However, the present invention is not limited thereto and, in consideration thereof, the magnifier block of the present invention may be positioned anywhere inside the view box for illuminating any particular area of the X-ray film.

A particular problem that has arisen is hiding the magnifier block 258 when the light source 246 is not on. It has been found that the magnifier block 258 casts a noticeable shadow on the lighted platform when not in use which will lead to the misreading of the X-ray film.

By experimentation, the present invention has been found to more than satisfactorily hide the magnifier block 258 by limiting the depth of the magnifier block 258 to 2 inches. In addition, the present invention by experimentation has been found to hide the magnifier block 258 by applying a thick coat of white diffusing paint. By experimentation, it has been found that the optimum thickness of the paint is at least 5 mils which is at least 2 mils greater than in the standard view box. With this arrangement, the magnifier of the view box of the present invention more than satisfactorily hides the magnifier block 258 when not in use. In addition, it was determined that limiting the diameter (outer) of the magnifier block 258 to not more than 1⅞ inches assists in hiding the block. Of course, the dimensions for the block magnifier and thickness of the white paint may be other than those disclosed.

It will be appreciated that each of the embodiments of the present invention may be permanently mounted on the view box or, in the alternative, are detachable such that the present invention may be provided to retrofit standard view boxes. It will further be appreciated that the magnifier for the view box of the present invention is not limited to the stationary view box but may, of course, be incorporated into multiple view boxes and/or mass film motorized viewers.

It will be appreciated from the foregoing that the present invention provides excellent magnification of the X-ray image. The present invention provides magnification without the necessity to touch either the magnifying lens or the X-ray film, thereby preventing any damage thereto which is particularly important when the operator is in surgery and wearing surgical gloves. In addition, the present invention provides conversion for the standard view box such that doctors worldwide have a quick and easy means for retrofitting their view boxes at low cost. Further, the magnifier of the present invention is unobtrusive such that it does not obstruct the view of the X-ray image.

Although preferred embodiments of the present invention and modifications thereof have been described in detail herein it is to be understood that this invention is not limited to those precise embodiments and modifications, and that other modifications and variations may be affected by one skilled in the art without departing from the spirit and scope of the invention as defined by the appended claims.

What is claimed is:

1. A magnifier apparatus for magnifying an image which is imaged by a view box having a lighted platform upon which film units are mounted, the apparatus comprising:
   a magnifying lens;
   a positioner for holding said magnifying lens at a distal end thereof proximate the image such that said magnifying lens magnifies a particular portion of interest of said image and for coupling said magnifier to said view box; and
   wherein said view box is an X-ray view box for imaging X-ray film units.

2. The apparatus according to claim 1, further comprising a longitudinal arm slidably coupled to said positioner such that said positioner is slidable along said longitudinal arm to longitudinal positions along said image, wherein said longitudinal arm is located on a side of the lighted platform such that said image is substantially unobstructed.

3. The apparatus according to claim 2, further comprising a hinge for hingedly coupling said positioner to said longitudinal arm such that said positioner is swiveled about said longitudinal arm and said magnifying lens may be positioned toward/away from said lighted surface which adjusts the magnifying strength of said magnifying lens.

4. The apparatus according to claim 3, wherein said hinge allows said positioner to position said magnifying lens to an open position such that said magnifying lens does not obstruct the image.

5. The apparatus according to claim 4, further comprising a mount for mounting coupled to said longitudinal arm for detachably mounting said longitudinal arm to said view box such that said view box may be converted to magnify the image.

6. The apparatus according to claim 1 further comprising:
   a motor for driving said positioner to position said magnifying lens to different positions proximate the image;
   an operator console coupled to said view box; and
   operator controls mounted on a operator console for controlling the motor thereby controlling the positioning of the magnifying lens.

7. The apparatus according to claim 6, further comprising a memory for storing/recalling positions of the magnifying lens.

8. The apparatus according to claim 7, wherein said memory further stores/recalls patient information.

9. The apparatus according to claim 8, wherein said operator console includes a keyboard for entering said positions and said patient information and a display for displaying said positions and said patient information.

10. The apparatus according to claim 8, wherein said operator console includes a joystick for controlling the motor thereby setting the positions of the magnifying lens.

11. The apparatus according to claim 8, further comprising:
   cross-bars arranged in lateral and longitudinal directions which are coupled at an intersecting point;
   wherein said motor drives the longitudinal direction of the cross-bars; and
   another motor for driving the lateral direction of the cross-bars;
   wherein said magnifying lens is coupled to said intersecting point of said cross-bars such that the longitudinal/lateral movement of said cross-bars move said intersecting point thereby positioning said magnifying lens proximate to said image.

12. The apparatus according to claim 11, wherein said cross-bars are positionable to a home location adjacent a corner of said lighted platform such that said cross-bars substantially do not obstruct the view of said image.

13. The apparatus according to claim 12, further comprising a swivel coupling said magnifying lens to said intersecting point of said cross-bars for swivelling said magnifying lens to a position proximate said image to an open position which does not obstruct a particular area of interest of said image.

14. The apparatus according to claim 1, wherein said magnifying lens is elongated in the lateral direction of the view box such that said magnifying lens spans at least a portion of said view box; further comprising a track for slidably positioning said magnifying lens in said longitudinal direction proximate said image.

15. The apparatus according to claim 14, wherein said magnifying lens comprises a flat surface which engages said lighted platform and an arcuate surface opposite said flat surface for magnifying said image.

16. The apparatus according to claim 1, wherein said positioner is integrated in the interior of said view box such that said magnifying lens is situated beneath said image; wherein light directed through said magnifying lens is redirected to an oblique direction, passes through said film unit and continues on in said oblique direction thereby magnifying said image.

17. The apparatus according to claim 16, further comprising a light source situated proximate said magnifying lens for providing said light directed through said magnifying lens.

18. The apparatus according to claim 17, wherein said positioner comprises a magnitier block for moving said magnifying lens and said light source within said view box to different positions of said image.

19. The apparatus according to claim 18, wherein said magnifier block further comprises an outer sleeve and an inner sleeve slidably coupled therein for holding said magnifying lens; wherein a focal length is adjusted by sliding said inner sleeve with respect to said outer sleeve.

20. The apparatus according to claim 19, wherein said inner sleeve is threaded; further comprising opposed threads which engage threads of said inner sleeve such that, when said opposed threads are rotated, said threads of said inner sleeve rotate thereby causing said inner sleeve and said magnifying lens coupled thereto to translate toward/away from said image thereby adjusting said focal distance.

21. The apparatus according to claim 16, further comprising a linearizer situated above said image for linearizing the magnified image.

22. The apparatus according to claim 21, wherein said linearizer is a transparent overlay which overlays said film unit; wherein said overlay does not obstruct the view of other portions of the image which are not magnified.

23. A magnifying method for magnifying an image which is imaged by a view box having a lighted platform upon which film units are mounted, the method comprising the steps of:
    coupling a magnifying lens to said view box;
    positioning said magnifying lens proximate the image such that said magnifying lens magnifies a particular portion of interest of said image; and
    wherein said view box is an X-ray view box for imaging X-ray film units.

24. The method according to claim 23, further comprising the step of converting said view box by fixing said magnifying lens semi-permanently on said view box.

25. The method according to claim 23, further comprising the step of longitudinally sliding said magnifying lens to position said magnifying lens along said image.

26. The method according to claim 23, further comprising the step of swiveling said magnifying lens about a longitudinal axis such that said magnifying lens may be positioned toward/away from said lighted surface which adjusts the magnifying strength of said magnifying lens.

27. The method according to claim 26, wherein said step of swiveling swivels said magnifying lens to an open position such that said magnifying lens does not obstruct the image.

28. The method according to claim 24, wherein said step of converting incorporates an operator-console to said view box for automatically controlling the position of said magnifying lens.

29. The method according to claim 23, further comprising the step of storing/recalling positions of the magnifying lens.

30. The method according to claim 29, farther comprising the step of storing/recalling patient information.

31. The method according to claim 23, further comprising the step of controlling the position of said magnifying lens by automatically moving cross-bars having an intersecting point which is coupled to said magnifying lens such that the longitudinal/lateral movement of said cross-bars move said intersecting point thereby positioning said magnifying lens proximate to said image.

32. The method according to claim 31, wherein said cross-bars are positionable to a home location adjacent a corner of said lighted platform such that said cross-bars substantially do not obstruct the view of said image.

33. The method according to claim 31, further comprising further comprising the step of swivelling said magnifying lens coupled to said intersecting point of said cross-bars to a position proximate said image to an open position which does not obstruct a particular area of interest of said image.

34. The method according to claim 23, wherein said magnifying lens is elongated in the lateral direction of the view box such that said magnifying lens spans at least a portion of said view box; further comprising the step of slidably positioning said magnifying lens in said longitudinal direction proximate said image.

35. The method according to claim 34, wherein said magnifying lens comprises a flat surface which engages said lighted platform and an arcuate surface opposite said flat surface for magnifying said image.

36. The method according to claim 23, further comprising the step of integrating said magnifying lens into the interior of said view box such that said magnifying lens is situated beneath said image, wherein light directed through said nagnifying lens is redirected to an oblique direction, passes through said film unit and continues on in said oblique direction thereby magnifying said image.

37. The method according to claim 36, further comprising the step of providing a light source situated proximate said magnifying lens for providing said light directed through said magnifying lens.

38. The method according to claim 36, further comprising the step of adjusting a focal length of said magnifying lens by sliding said magnifying lens with respect to said image.

39. The method according to claim 36, further comprising the step of linearizing the magnified image.

* * * * *